May 26, 1959  L. E. AUSTIN  2,887,920
POWER-OPERATED TORQUE WRENCH
Original Filed Nov. 8, 1955  3 Sheets-Sheet 1
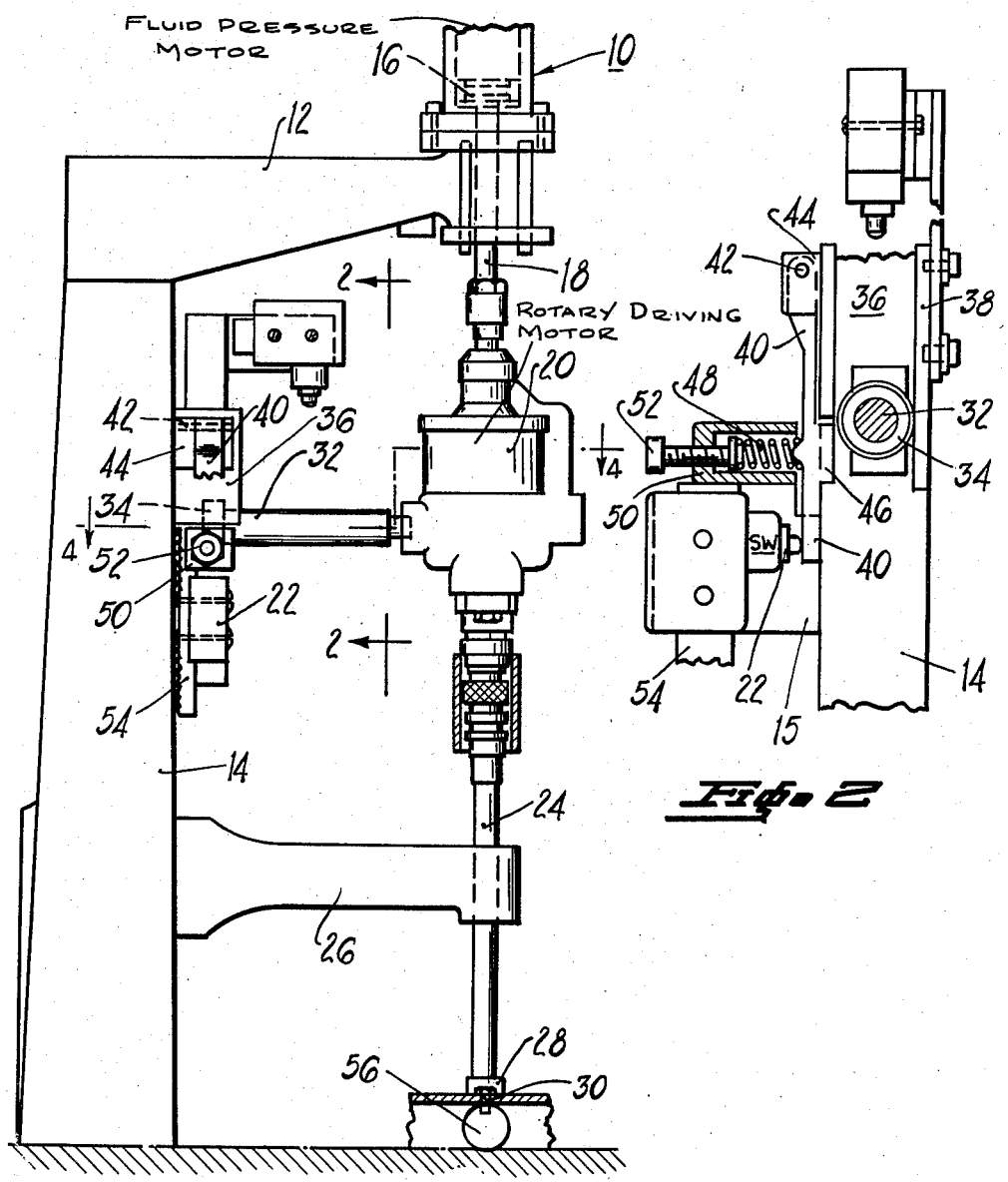
INVENTOR.
LEONARD E. AUSTIN
BY
H. O. Clayton
ATTORNEY

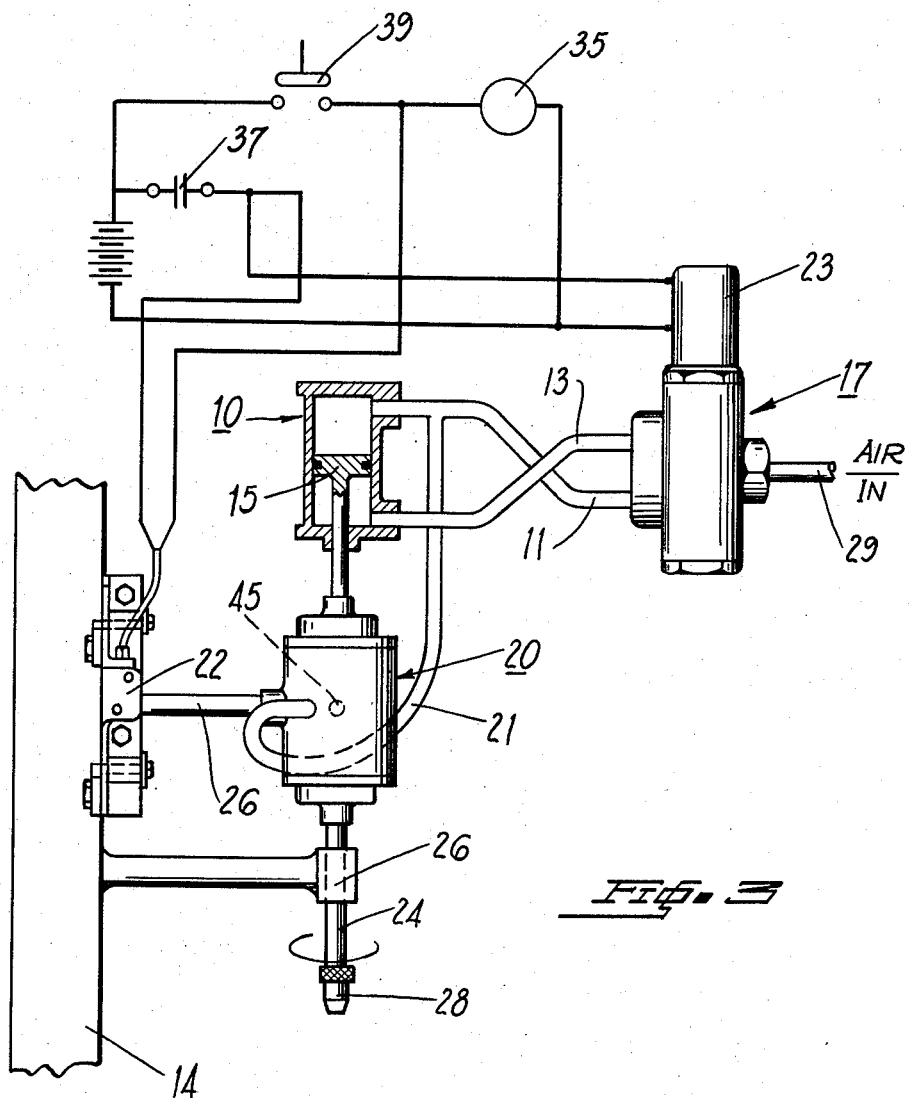

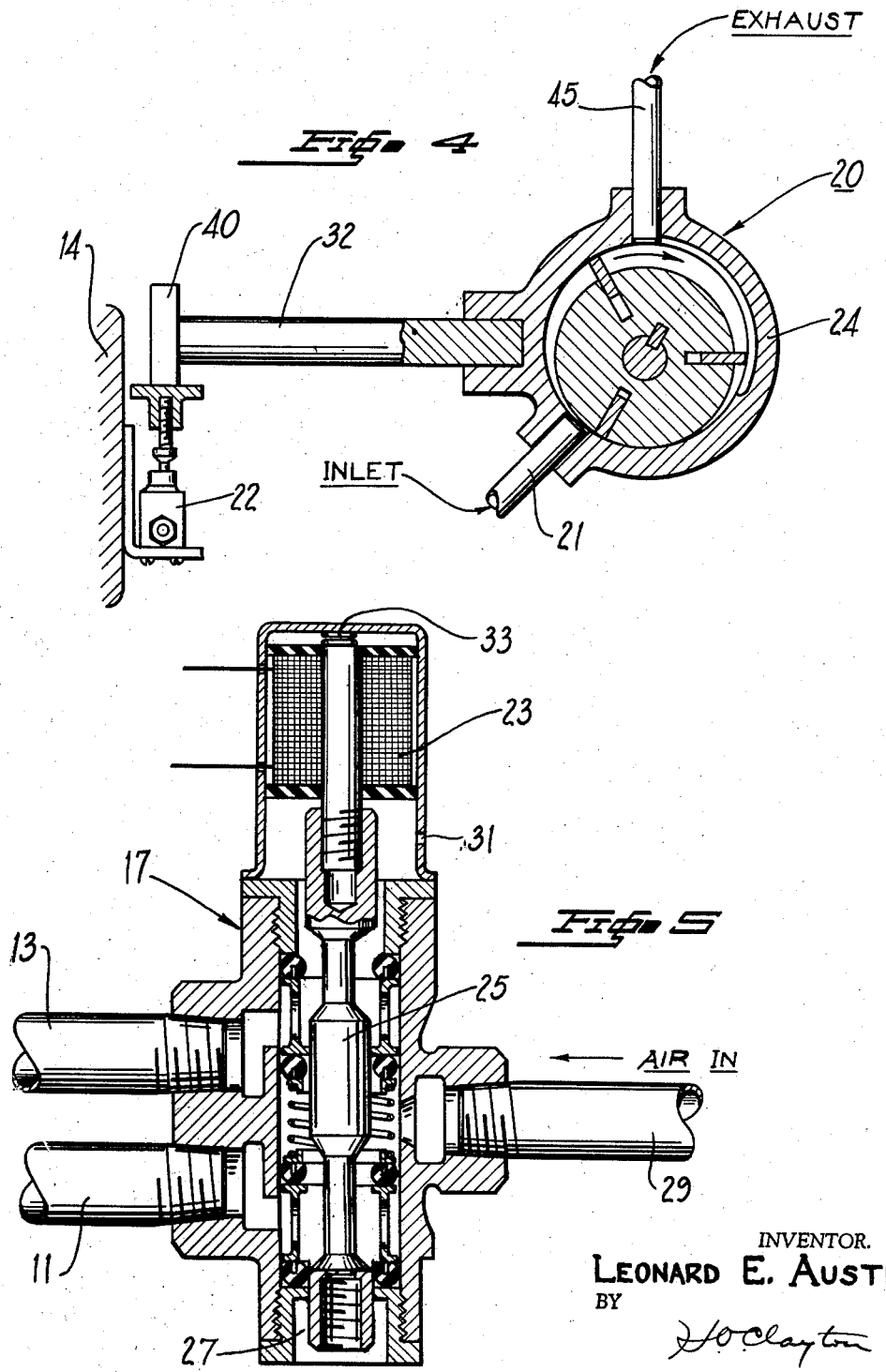

United States Patent Office 2,887,920
Patented May 26, 1959

2,887,920

POWER-OPERATED TORQUE WRENCH

Leonard E. Austin, South Bend, Ind., assignor to Bendix Aviation Corporation, South Bend, Ind., a corporation of Delaware Original application November 8, 1955, Serial No. 545,589. Divided and this application February 27, 1957, Serial No. 642,855

13 Claims. (Cl. 81—52.4)

This invention relates in general to a mechanism for securing together a plurality of parts of a work piece and in particular to a screw driver mechanism for correctly operating a screw in the operation of interconnecting two elements such as a brake cylinder and a brake backing plate of an automotive brake.

An important object of my invention is to provide a mechanism for quickly and effectively operating a fastening means in the operation of securing two elements together, the operation of said mechanism being automatically terminated when there has been a certain translatory movement of the fastening means and when the force required to operate said means reaches a certain value.

My invention contemplates the provision of a torque and distance responsive screw driving mechanism including means which is very quickly operative to terminate the driving operation of the mechanism immediately after the driving force exerted by the mechanism reaches a certain value provided, however, the screw being rotated into place has, at the time, reached a certain position.

A further object of my invention is to provide, in combination with driving means for fitting a fastening member into a work piece and means for bodily moving said fastening toward and into said work piece, means for controlling the operation of both of said means responsive to the torque exerted by said driving means and responsive to the depth to which the fastening means is projected into the work piece by the second mentioned, that is bodily moving means.

Other objects of the invention and desirable details of construction of parts will become apparent from the following detailed description of an illustrative embodiment of the invention, taken in conjunction with the accompanying drawings illustrating said embodiment, in which:

Figure 1 is a side elevational view disclosing details of the torque and depth responsive control means constituting my invention;

Figure 2 is a view, looking in the direction of arrows 2—2 of Figure 1, disclosing other details of the mechanism of my invention;

Figure 3 is a diagrammatic view of the parts of the control means of the mechanism of Figure 1;

Figure 4 is a sectional view, taken on the line 4—4 of Figure 1, disclosing certain details of the control means of the mechanism of Figure 1; and Figure 5 is a sectional view disclosing details of the four-way valve of the control means of the mechanism of Figure 1.

Describing now a preferred embodiment of my invention disclosed in the two figures of the drawings, there is disclosed, in Figure 1, a work station which is one of the several stations disclosed in the screw driver mechanism of my U.S. patent application No. 545,589, filed November 8, 1955. The instant application is a division of the latter application.

This station includes a double acting fluid pressure motor 10 mounted on a cross bar 12 secured to a standard 14; and this motor is controlled by a valve, not shown. The power element 16 of the motor 10 is fixedly connected, by a rod 18, to the casing of a fluid pressure operated rotary driving motor 20 of any suitable design. The latter motor is controlled by a valve, not shown; and this valve and the aforementioned valve are controlled by means including a normally open torque and depth control cut off switch 22 both motors being rendered temporarily inoperative by an operation of the switch 22. No claim is made to the motors per se or the particular means for controlling them; accordingly, the motors and their controls, with the exception of the cut off switch 22, are not disclosed in this application. My invention here is directly solely to the hereinafter described torque and depth control means for operating the cut off switch 22.

The rotor, not shown, of the motor 20 is connected to a driving shaft 24 which extends through a cross bar 26 secured to the standard 14; and a socket wrench 28, mounted on the lower end of the shaft 24, is fed screws 30 from a hopper, not shown. An arm 32, fixedly secured to the casing of the driving motor 20, is provided with a roller 34 at its end, Figure 2, said roller slidably fitting within a channel made up of a portion of the standard 14 and spaced apart prism-shaped members 36 and 38 fixed to said standard. A lever member 40, pivotally mounted at 42 upon a flange 44 secured to the standard 14, is provided with a prism-shaped flange 46 the side face of which is flush with the inner face of the channel member 36. In other words, the side face of the prism member 46 lies in the plane of the inner face of the channel member 36.

A spring 48, housed within a cup-shaped member 50 and adjustably loaded by a screw 52 mounted in said member, serves to bias the lever 40 into contact with the channel member 36 when the roller 34 is out of contact with the member 46; and said spring also serves to bias the member 46 into contact with said roller when the latter is opposite said member. The spring housing member 50 is fixed to a mounting 54 which is secured to the standard 14 by a member 15; and said mounting also serves as a support for the control switch 22 which is closed by a clockwise rotation of the lever 40.

Describing the closing operation of the switch 22, it is to be remembered that, by virtue of the tolerances in the construction of the switch and associated parts, a certain lateral bodily movement of the roller is necessary to close said switch; and this switch closing movement is executed very shortly after the roller 34 has moved into full contact with the prism-shaped portion 46 of the lever, that is when the roller is clear of the member 36.

The valvular means for controlling the fluid pressure motors 10 and 20 and the electrical means, including the aforementioned switch 22, for controlling said valvular means, constitutes no part of my invention; however, to make the disclosure of my preferred embodiment complete one well known control means is disclosed in Figures 3, 4, and 5 of this application. Referring therefore to Figure 3 diagrammatically disclosing the latter control, conduits 11 and 13 are connected to the double ended motor 10 on opposite sides of its piston 15, and are connected to opposite ends of a so-called four-way valve 17. A conduit 21, interconnecting the motor 20 and the conduit 11, serves to supply air under pressure to energize said motor when the valve 17 is operated to energize the motor 10 to bodily move the then energized motor 20 downwardly.

Describing the operation of the valve 17 disclosed in detail in Figure 5, this valve is operated in part by a solenoid 23 mounted on one end of the casing of the valve. As will be noted from an inspection of Figure 5 energization of the solenoid 23 serves to move a valve plunger 25 upwardly to close the air transmitting connection between a vent port 27 and the conduit 11, open the connection between the latter conduit and a conduit 29 leading to a suitable source of air pressure not shown, and open the connection between a vent port 31 and the conduit 13; and this operation of the valve results in an energization of the motor 10 to bodily move the motor 20 downwardly and at the same time an energization of the motor 20 to effect a clockwise rotation of the screw operating drive shaft 24. As will be obvious from the above description and an inspection of Figure 5 of the drawings, when the solenoid 23 is de-energized a spring 33, compressed with an energization of the solenoid, expands to move the valve plunger 25 downwardly to reverse the connection to the motors 10 and 20 to vent the conduits 11 and 21 to the atmosphere and connect the conduit 13 to the source of air pressure; and this valve operation serves to energize the motor 10 to bodily return the motor 20 to its up position and substantially simultaneously therewith vent the vane type motor 20 to the atmosphere via the conduit 21 and thereby stop the drive shaft operation of said motor. The vanes and shaft driving rotor of the motor 20 are disclosed in some detail in Figure 4, however, such a vane type motor is well known to those skilled in this art; accordingly it is not described in detail in this specification.

Describing the electrical means for controlling the operation of the solenoid 23, a relay, the coil 35 of which actuates a relay switch 37, is controlled by a manually operated push button type of switch 39; and as disclosed in Figure 3, the above described normally closed switch 22 serves as a so-called hold down switch in the circuits; for when the coil 35 is energized by a closing of the switch 39 the relay switch 37 is closed and then when the attendant takes his finger off of the switch 39 the normally closed switch 22 takes over the control to keep the relay coil energized. Now as will be noted by an inspection of the circuits of Figure 3, when the relay switch 37 is closed the solenoid 23 is energized to operate the valve 17 to effect the above described energization of the motors 10 and 20 to turn the screw 30; and when this screw operation is completed, as described above, the switch 22 is opened thereby de-energizing the solenoid 23 to initiate the return of the motor 20.

There is thus provided a relatively simple, effective, and easily serviced mechanism for securing together two parts of a work piece. The mechanism of my invention provides means for automatically cutting off the operation of the power means for operating the fastening means when and if the force necessary to rotate said fastening means has reached a certain value, and when and if the fastening means has been buried into the work piece a certain depth. In other words, with the mechanism of my invention the operation of securing the fastening means in place is automatically terminated when said means is secured tight enough and deep enough in the work piece.

Briefly describing the complete operation of the mechanism of my invention assuming a screw 30 is in place in the socket wrench 28, and energization of the motors 10 and 20 results in a rotation of the shaft 24 and a concurrent bodily movement of the motor 20 and arm 32 downwardly. The rotating screw then enters aligned threaded openings in a two-part work piece 56, e.g. a slave cylinder and a backing plate of an automotive brake, to secure said parts together. The parts of the mechanism are so constructed and positioned that the threading of the screw 30 into the aligned openings is just about complete when the roller 34 contacts the thrust member 46; and the next relatively small increment of bodily movement of the roller results in said roller clearing the channel member 36 sufficiently to make possible an angular movement of the lever. This movement of the lever serves to operate the switch 22 to cut off the operation of the motors 10 and 20; and this operation of the switch is effected when the torque exerted by the arm 32 is sufficient to overcome the friction of the parts including the switch parts, and overcome the loading of the spring 48. The parts of the mechanism of my invention are so constructed and arranged and the loading of the spring 48 is so set that the switch 22 is operated when the screw 30 has been threaded as desired.

There is thus provided a relatively simple, effective, and easily serviced mechanism for securing together two parts of a work piece. The mechanism of my invention provides means for automatically cutting off the operation of the power means for operating the fastening means when and if the torque force necessary to rotate said fastening means has reached a certain value, and when and if the fastening means has been buried into the work piece a certain depth. In other words, with the mechanism of my invention the operation of securing the fastening means in place is automatically terminated when said means is secured tight enough and deep enough in the work piece. The roller 34 must have been bodily moved downwardly sufficiently to clear the channel member 36 and the torque exerted by the arm 32 must be sufficient to operate the switch 22; both conditions must be satisfied.

While the preferred embodiment of the invention has been described in considerable detail, I do not wish to be limited to the particular construction shown, which may be varied within the scope of the invention, and it is the intention to cover hereby all adaptations, modifications and arrangements thereof which come within the practice of those skilled in the art to which the invention relates.

I claim:

1. The combination with driving means for fitting a fastening member into an opening of a work piece having a plurality of elements to be secured together by said member, and means for moving said fastening member toward and into said opening, of means for controlling the operation of both of said means to limit the force exerted by said driving means and to limit the depth to which the fastening means is projected into the opening by the second mentioned means.

2. The combination with a driving motor for fitting a fastening member into an opening of a work piece having a plurality of elements to be secured together, and a motor for moving said fastening means toward and into said opening, of automatically operable means for controlling the operation of both of said motors to limit the force exerted by said driving motor and to limit the depth to which the fastening means is projected into the opening by the second mentioned motor.

3. The combination with a driving motor for fitting a fastening member into an opening of a work piece having a plurality of elements to be secured together by said member, and a motor for moving said fastening means toward and into said opening, of automatically operable torque and depth sensitive means, including a switch for controlling the operation of both of said motors, operative to limit the force exerted by said driving motor and to limit the depth to which the fastening means is projected into the opening by the second mentioned motor.

4. A screw driver mechanism operative to effect a controlled translatory and rotary movement of a fastening member, said mechanism including power means adapted to move the fastening means toward and into a work piece having a plurality of parts to be secured together, power operated driving means for rotating the fastening means as it enters aligned openings in the work piece to thereby secure together the aforementioned parts of said work piece, and means for controlling the operation of both of said power means to temporarily disable, that is, cut off the operation of said two power means when the fastening means has, in its operation, been buried within the work piece a certain depth and the driving force exerted by the driving means has reached a certain value.

5. A screw driver mechanism operative to effect a controlled translatory and rotary movement of a fastening member, said mechanism including a support means for the elements of the mechanism, power means, including a fluid pressure motor, adapted to move the fastening means toward and into a work piece having a plurality of parts to be secured together said power means being mounted on the support means, power operated driving means, including a fluid pressure motor, for rotating the fastening means as it enters aligned openings in the work piece to secure together the aforementioned parts of said work piece, said latter power means also being mounted on the support means; and means for controlling the operation of both of said power means to temporarily disable, that is, cut off the operation of said two power means when the fastening means has, in its operation, been buried within the work piece a certain depth and also when the driving force exerted by the driving means has reached a certain value.

6. A screw driver mechanism operative to effect a controlled translatory and rotary movement of a fastening member, said mechanism including a support means for the elements of the mechanism, power means, including a fluid pressure motor, adapted to move the fastening means toward and into a work piece having a plurality of parts to be secured together, said means being mounted on the support means, power operated driving means, including a fluid pressure motor, for rotating the fastening means as it enters aligned openings in the work piece to secure together the aforementioned parts of said work piece, said latter power means also being mounted on the support means; and a torque and depth sensitive means, including a switch and a lever for operating the switch, for controlling the operation of both of said power means to temporarily disable, that is, cut off the operation of said two power means when the fastening means has, in its operation, been buried within the work piece a certain depth and also when the driving force exerted by the driving means has reached a certain value.

7. A screw driver mechanism adapted to concurrently effect a translatory and rotary movement of a screw in the operation of securing said screw in place, said mechanism including a bodily and rotatably movable shaft, means mounted on the end of said shaft and adapted to house a screw, a driving motor connected to the shaft and adapted to rotate the same, another motor for bodily moving the driving motor and shaft connected thereto; and means for controlling the operation of said motors to automatically cut off the same when the shaft rotating force exerted by the driving motor reaches a certain figure and the shaft has moved a certain distance in the operation of the mechanism.

8. A screw driver mechanism adapted to concurrently effect a translatory and rotary movement of a screw in the operation of securing said screw in place, said mechanism including a bodily and rotatably movable shaft, means mounted on the end of said shaft and adapted to house a screw, a driving motor connected to the shaft and adapted to rotate the same, another motor for bodily moving the driving motor and shaft connected thereto, and means for controlling the operation of said motors to automatically cut off the same when the shaft rotating force exerted by the driving motor reaches a certain figure and the shaft has moved a certain distance in the operation of the mechanism, said control means including a bodily movable arm secured to the driving motor, motor control means actuated by an element mounted on the outer end of said arm, and means for controlling the mode of movement of the arm to determine the time of operation of the motor control means.

9. A screw driver mechanism adapted to concurrently effect a translatory and rotary movement of a screw in the operation of securing said screw in place, said mechanism including a bodily and rotatably movable shaft, means mounted on the end of said shaft and adapted to house a screw, a driving motor connected to the shaft and adapted to rotate the same, another motor for bodily moving the driving motor and shaft connected thereto; and means for controlling the operation of said motors to automatically cut off the same when the shaft rotating force exerted by the driving motor reaches a certain figure and the shaft has moved a certain distance in the operation of the mechanism, said means including a bodily movable arm secured to the driving motor and operatively movable in two different planes; motor control means, including a switch, actuated by an element mounted on the outer end of said arm, and means, comprising a switch operating lever member, for controlling the mode of movement of the arm to determine the time of operation of the motor control means.

10. The combination with driving means for fitting a fastening member into an opening of a work piece having a plurality of elements to be secured together by said member, and means for moving said fastening member toward and into said opening, of means for controlling the operation of both of said means responsive to the force exerted by said driving means and responsive to the depth to which the fastening means is projected into the opening by the second mentioned means.

11. The combination with driving means for fitting a fastening member into an opening of a work piece having a plurality of elements to be secured together by said member, and means for moving said fastening member toward and into said opening, of means responsive to angular torque to cause a cessation of operation of both of said means, and means indicative of the lineal position of the latter means for controlling the operation of said latter means.

12. A screw driver mechanism adapted to concurrently effect a translatory and rotary movement of a screw in the operation of securing said screw in place, said mechanism including a bodily and rotatably movable shaft, means mounted on the end of said shaft and adapted to house a screw, a driving motor connected to the shaft and adapted to rotate the same, another motor for bodily moving the driving motor and shaft connected thereto, and means for controlling the operation of said motors to automatically cut off the same when the shaft rotating force exerted by the driving motor reaches a certain figure and the shaft has moved a certain distance in the operation of the mechanism, said control means including a bodily and angularly movable arm secured to the driving motor, motor control means actuated by an element mounted on the outer end of said arm, and means for controlling the mode of movement of the arm to determine the time of operation of the motor control means, said means including a channel for guiding the movement of the arm and a lever member cooperating with a portion of said channel, the parts of the channel, arm and lever being so constructed and arranged that when the arm reaches a certain point in its bodily movement through the channel the lever is actuated, thereby operating the motor control means to effect the cut off operation.

13. A screw driver mechanism adapted to concurrently effect a translatory and rotary movement of a screw in the operation of securing said screw in place, said mechanism including a bodily and rotatably movable shaft, means mounted on the end of said shaft and adapted to house a screw, a driving motor connected to the shaft and adapted to rotate the same, another motor for bodily moving the driving motor and shaft connected thereto, and means for controlling the operation of said motors to automatically cut off the same when the shaft rotating force exerted by the driving motor reaches a certain figure and the shaft has bodily moved a certain lineal distance in the operation of the mechanism, said control means including a bodily and angularly movable arm secured to the driving motor said arm having a roller member mounted on its outer end, motor control means actuated by an element mounted on the outer end of said arm, and means for controlling the mode of movement of the arm to determine the time of operation of the motor control means, said control means including a channel for guiding the bodily movement of the arm, and a lever member, having a thrust member mounted on its end, cooperating with a portion of said channel; the parts of the channel, arm and lever being so constructed and arranged that when the arm reaches a certain point in its bodily movement through the channel the roller member on its end, then clear of the channel, contacts the thrust member on the lever thereby actuating said lever to effect the cut off operation of the motor control means.

References Cited in the file of this patent

UNITED STATES PATENTS

| | | |
|---|---|---|
| 1,479,178 | Harvey | Jan. 1, 1924 |
| 1,648,944 | Hofstetter | Nov. 15, 1927 |
| 1,662,543 | Smith | Mar. 13, 1928 |
| 2,627,770 | Hautau et al. | Feb. 10, 1953 |
| 2,705,030 | Koffler et al. | Mar. 29, 1955 |